United States Patent
Bekkers

(10) Patent No.: US 7,306,242 B2
(45) Date of Patent: Dec. 11, 2007

(54) DEVICE FOR CARRYING A GOLF BAG AS WELL AS A METHOD FOR MANUFACTURING THE SAME

(76) Inventor: Bernardus Johannes Joseph Maria Bekkers, Koriander 1, 5491 KD Sint-Oadenrode (NL)

( * ) Notice: Subject to any disclaimer, the term of this patent is extended or adjusted under 35 U.S.C. 154(b) by 0 days.

(21) Appl. No.: 10/379,405

(22) Filed: Mar. 3, 2003

(65) Prior Publication Data

US 2004/0100070 A1     May 27, 2004

(30) Foreign Application Priority Data

Mar. 11, 2002  (NL) .................................. 1020155

(51) Int. Cl.
  *A63B 55/00*    (2006.01)
  *A62B 1/12*    (2006.01)
(52) U.S. Cl. .................... 280/30; 280/47.24; 280/646; 280/DIG. 6
(58) Field of Classification Search ............ 280/47.24, 280/47.17, 47.26, 652, 38, 42, 645, 648, 280/47.31, DIG. 6, 646
See application file for complete search history.

(56) References Cited

U.S. PATENT DOCUMENTS

| | | | | |
|---|---|---|---|---|
| 2,040,339 A | * | 5/1936 | Ross ........................ | 280/47.26 |
| 2,575,930 A | * | 11/1951 | Schwartz .................. | 280/47.26 |
| 2,647,762 A | | 8/1953 | Jamieson et al. ............. | 280/41 |
| 2,687,895 A | * | 8/1954 | Rutledge .................. | 280/47.26 |
| 3,079,166 A | * | 2/1963 | Abgarian ..................... | 280/40 |
| 3,189,364 A | * | 6/1965 | Westphal ................... | 280/646 |
| 3,265,402 A | * | 8/1966 | Snyder ...................... | 280/646 |
| 3,291,502 A | * | 12/1966 | England .................... | 280/645 |
| 3,459,434 A | * | 8/1969 | Dulaney .................... | 280/38 |
| 3,726,537 A | | 4/1973 | McLoughlin ............ | 280/47.26 |
| 3,762,737 A | * | 10/1973 | Good ........................ | 280/655 |
| 4,792,152 A | * | 12/1988 | Carolan ................... | 280/47.26 |
| 5,074,577 A | | 12/1991 | Kim .......................... | 280/646 |
| 5,354,089 A | * | 10/1994 | Sohrt et al. ................. | 280/645 |
| 5,451,072 A | | 9/1995 | Weng ........................ | 280/646 |
| 5,551,716 A | * | 9/1996 | Kordecki et al. ........ | 280/47.18 |
| 5,632,496 A | * | 5/1997 | Nelson ....................... | 280/30 |
| 5,829,585 A | * | 11/1998 | Kao et al. ................ | 206/315.3 |
| 6,186,520 B1 | * | 2/2001 | Barten ....................... | 280/30 |
| 6,425,589 B1 | * | 7/2002 | Wu ............................ | 280/30 |
| 6,435,539 B1 | * | 8/2002 | Wu ............................ | 280/652 |
| 6,758,481 B2 | * | 7/2004 | Blomgren ................ | 280/47.26 |

\* cited by examiner

*Primary Examiner*—Christopher P. Ellis
*Assistant Examiner*—Bridget Avery
(74) *Attorney, Agent, or Firm*—Ladas & Parry LLP

(57) ABSTRACT

The invention provides a device for carrying a golf bag, comprising a frame with a frame bar extending in longitudinal direction along the golf bag, supporting elements attached to the frame or forming an integral part thereof for directly supporting the bag, and detachable fixing means for fixing the golf bag in position against at least a part of said supporting elements, wherein the supporting elements are interconnected by means of a subframe extending outside the golf bag, with the subframe being connected to the frame bar of the frame by means of manually detachable connecting means. The invention furthermore relates to a method for manufacturing such a device.

12 Claims, 6 Drawing Sheets

DEVICE FOR CARRYING A GOLF BAG AS WELL AS A METHOD FOR MANUFACTURING THE SAME

DESCRIPTION

The invention relates to a device for carrying a golf bag, comprising a frame with a frame bar extending in longitudinal direction along the golf bag, supporting elements attached to the frame or forming an integral part thereof for directly supporting the bag, and detachable fixing means for fixing the golf bag in position against at least a part of said supporting elements.

Such devices are widely known in the form of golf bag trolleys. An example thereof is disclosed, for example, in U.S. Pat. No. 5,451,072. The golf trolley disclosed therein is supplied to the consumer as a do-it-yourself kit, so that the transport and storage charges can be reduced. The golf trolley comprises a frame which mainly consists of a longitudinal bar built up of various tubular members. Said longitudinal bar is provided with a lower and an upper arched supporting element at its front side, with the common central axis of the arches extending parallel to the longitudinal direction of the longitudinal bar. At its bottom side, the longitudinal bar is furthermore provided with a supporting platform for supporting a golf bag. In the supported position of the golf bag, the golf bag extends parallel to the longitudinal bar and is pressed against or at least fixed in position with respect to the supporting elements by means of two belt elements for each supporting element joining the ends of the arches of the upper supporting elements, which can be coupled together by means of a quick-action coupling. Two folding legs fitted with wheels at their ends are provided at the rear side of the longitudinal bar, which legs give the device its trolley-like character. At its upper side, the longitudinal bar is provided with a handle, by means of which the device and the trolley present thereon can easily be tilted about the central axis of the wheels and be rolled across a surface.

In practice it has become apparent that it is desirable at various moments to detach the golf bag from the golf trolley and attach it thereto again. To this end, said belt elements need to be uncoupled and subsequently be coupled again. Said uncoupling and in particular the coupling together of the belt elements again under a pulling load, in particular of the lower belt elements, appears to be a difficult job in practice, which requires the exertion of considerable force. For some golf players, this constitutes such a high threshold that their desire to use the trolley with the golf bag at all, or at least use it in the correct way, vanishes. As a result, only the upper belt elements are used, for example, which leads to extra wear on the golf bag, in part because of the risk of the golf bag moving off the supporting platform at its bottom side or turning around its longitudinal axis, which may make it more difficult to place golf clubs into the golf bag.

In order to make it easier to connect a golf bag to a trolley and disconnect it therefrom, it has already been proposed in the patent literature to use alternative connecting systems. Thus, U.S. Pat. No. 5,074,577 discloses a golf bag having rigid edges at its upper side and its lower side, to which edges connecting elements provided with openings facing each other are attached. Said openings are capable of receiving an extensible bar of a trolley. An important drawback of the solution that is disclosed in said document is the fact that the system is only suitable for use with specific golf bags fitted with the aforesaid connecting elements. In addition to that, the extensible bar makes the construction of the golf trolley complex.

U.S. Pat. No. 4,792,152 discloses a golf trolley consisting of a substantially U-shaped wheel frame and an axle extending through the ends of the legs of the U-shape, on which a wheel is rotatably mounted on either side of the U-shape. At the location of the web of the U-shape, the wheel is detachably connected to a longitudinal bar, which is provided at two longitudinal positions thereof with arched brackets fitted with belt elements for enclosing a golf bag. The golf trolley can be disassembled for the greater part, with the various individual parts being attached to the longitudinal bar or to the golf bag. An important drawback of this golf strongly is the fact that practical use thereof is not possible while it is being assembled and disassembled. This is caused in part by the fact that the U-shaped bracket of the wheel frame will tilt downwards as soon as it is detached from the longitudinal bar. In addition, the longitudinal bar is provided with a handle at its ends, which handle does not perform an independent function any more but is only a nuisance to the user once the golf trolley has been disassembled.

The trolley according to U.S. Pat. No. 2,647,762 is used in combination with a golf bag provided with an elongated strengthening strip positioned inside the golf bag, which is connected to brackets on the outer side of the golf back by means of a bolt-nut combination, with the bolt extending through the wall of the bag. A major drawback of such an embodiment is the fact that the use of the strengthening strip makes it necessary to damage the bag, whilst in practice said strip will only be used in combination with one and the same golf bag.

U.S. Pat. No. 3,726,537 and British patent application No. 2,284,578 describe trolleys which can only be used in combination with golf bags that are fitted with special facilities.

The object of the invention is to provide a solution or at least an improvement with regard to the drawbacks of the prior art as described above, whether or not in preferred embodiments of the invention. In order to accomplish that objective, the supporting elements are interconnected by means of a subframe extending outside the golf bag, with the subframe being connected to the frame bar of the frame by means of manually detachable connecting means. The use of such a subframe makes it possible to detach the part of the device supporting the golf bag from the remaining part of the frame and reconnect it thereto in a quick and easy manner, which remaining part can thus retain its other independent functions. As a result, the orientation and the position of the frame are not affected by the subframe being connected to the frame or being detached therefrom. This facilitates the use of the device according to the invention. In addition, the use of the subframe according to the invention does not necessarily stand in the way of the golf bag with the subframe connected thereto standing on its own. In addition to that it is noted that since it is in principle possible to use conventional type supporting elements, there is no need to provide the golf bag with special features, so that in that sense the device according to the invention can be universally used in combination with all the usual types of golf bags. Furthermore it is important to note that the term "manually" should not be interpreted literally within the framework of the invention. The term "manually" is to be understood to mean a situation in which no tools are required, but in which any human limb can do the job. Thus it is also conceivable within the framework of the invention to detach the connecting means by means of foot-operation.

A constructionally very simple embodiment, in which a relatively rigid connection between the subframe and the frame bar can be effected, is obtained if the subframe comprises a subframe bar extending at least substantially parallel to the frame bar. The parallel arrangement of the frame bar and the subframe bar makes it possible to create mutual engagement points at several longitudinal positions. In addition, the subframe bar makes it possible to interconnect the supporting elements in a constructionally very simple manner.

A very suitable embodiment of the connecting means is obtained if the connecting means comprise a first U-shaped bracket which is fixed to either one of the frame and the subframe for receiving an engagement portion of the other one of said frame and said subframe between the legs of the U-shape. The use of such a U-shaped bracket allows a simple manner of interconnecting the frame bar and the subframe.

Such a simple connection can be obtained, for example, if the first U-shaped bracket clampingly engages around the engagement portion of the other one of said frame and said subframe. The clamping engagement directly provides fixation of the connection in that case.

Alternatively, or in addition, it is also advantageously possible for the fixing means to comprise a locking pin for locking interconnection of the legs of the first U-shaped bracket behind the engagement portion. Such a locking co-operation can prevent the other one of said frame and said subframe from moving out from its position between the legs of the first U-shaped bracket.

In addition to that, several advantages can be obtained if the connecting means comprise a second U-shaped bracket which is fixedly connected to the frame bar for supporting the subframe by means of a supporting element which is fixedly connected to the subframe, which supporting element is accommodated between the legs of the U-shape of the second U-shaped bracket. When such a construction is used, the force of gravity from the subframe, and possibly also from a part of the golf bag, is resisted in a constructionally simple manner.

In order to render the device according to the invention suitable for use in combination with various types of golf bags without said golf bags requiring special features, it is preferable for the supporting elements to comprise at least one contour member for partially enclosing the golf bag, the ends of which can be interconnected by means of a flexible belt element forming part of the fixing means for accommodating the golf bag between the belt elements and said at least one contour member. Such a contour member provided with a belt element corresponds to the usual golf trolleys, so that the universal usability of the device according to the invention is evident.

In this connection it is also preferable for the supporting elements to comprise a supporting platform for supporting the golf bag. The use of such a supporting platform does not interfere with the capability of the golf bag to stand on its own (with the subframe connected thereto), either.

According to a very advantageous preferred embodiment, the subframe is provided with at least two folding legs. These two folding legs, which can preferably be disconnected from the subframe, enable the subframe, including the golf bag, to stand on its own in a very stable way, so that the opening of the golf bag can continue to face upwards.

In order to obtain a mobile trolley function, the frame is preferably fitted with at least one wheel, which may or may not be electrically driven. It is important to note, however, that the invention is by no means limited to a frame of such design. Alternatively, it may be considered to design the frame as a frame bar which can be attached to a wall, possibly spaced therefrom by some distance, for the purpose of hanging a golf bag on a wall, so that the bag can be stored in a stable manner some distance above from the floor. In addition to that it is possible, for example, for the frame bar of the frame to be fixed to a means of transport, such as a car, a bicycle or a golf cart, so that the golf bag can easily be connected to the means of transport in question. It stands to reason that, in use, one subframe with a golf bag attached thereto can be combined with a number of frames.

In order to render the device according to the invention suitable for golf bags of varying dimensions, a preferred embodiment of the device is characterized in that the subframe bar is provided with connecting holes at least two longitudinal positions thereon, so as to make it possible for one and the same connecting element to be alternately connected to the subframe bar at said at least two longitudinal positions.

The ease of use of the device will be further enhanced if the connecting means comprise a snap connection.

Following on the above, the invention furthermore relates to a method for manufacturing a device according to the invention as described above. The method according to the inventive concept is based on the insight that it is not only possible to manufacture such devices by means of a conventional production process, but that it is also possible to adapt existing devices in a simple manner and thus obtain a device according to the invention. To this end, the method according to the invention is characterized in that the supporting elements of an existing device for carrying a golf bag, which comprises a frame bar extending along the golf bag and supporting elements for directly supporting the bag, which supporting elements are attached to the frame or which form an integral part thereof, are removed from said device, after which a subframe comprising supporting elements to be interconnected via the subframe, which subframe can be connected to the frame bar of the frame by means of manually detachable connecting means, is added to the remaining part of the existing device.

A very efficient use of material, which is also advantageous from a viewpoint of cost control, is obtained if the supporting elements are connected to a subframe after being removed. In particular in the case of series adaptation of existing devices as described above, it is not necessary, of course, to connect the supporting elements that have been removed from a particular device to the subframe that is being added to the device in question.

The invention will be explained in more detail hereinafter by means of a description of a device according to the invention. In the description, reference will be made to the following figures.

FIG. 3 shows the subframe of the trolley of FIG. 3, the golf bag and part of the trolley frame are illustrated in dotted lines therein.

Figure 1:
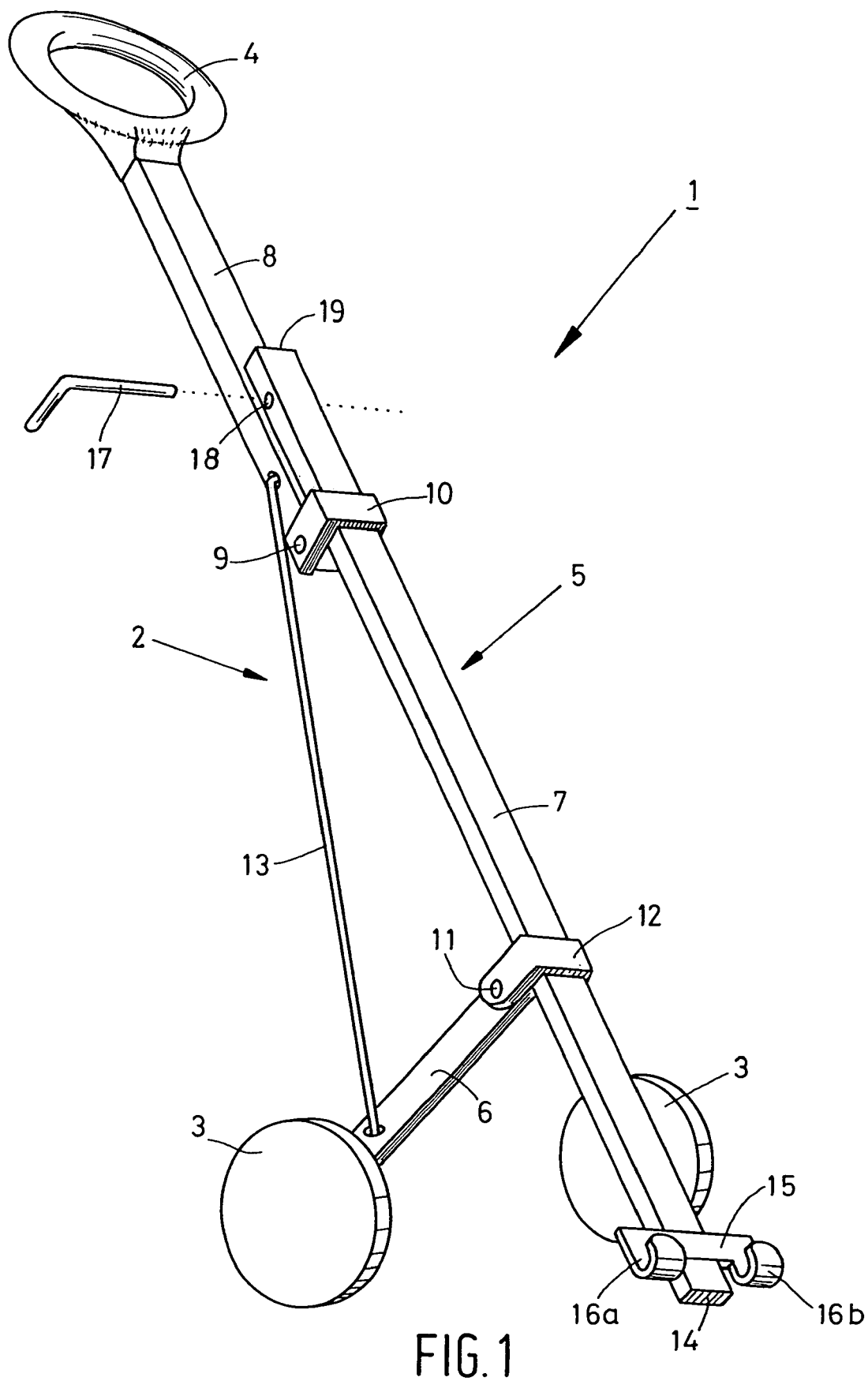
FIG. 1 shows a frame of a device according to the invention.

FIG. 1 shows a trolley 1, which is built up in the main of a frame 2, wheels 3 and a handle 4. The frame 2 comprises a longitudinal bar 5 and two wheel arms 6 (only one of which is shown) extending from the longitudinal bar 5 in the shape of a V. The wheels 3 are rotatably mounted on the free ends of the respective wheel arms 6. The longitudinal bar 5 is built up of a lower bar member 7 and an upper bar member 8. The upper bar member 8 is pivotally connected to the lower bar member 7 by means of a pivot pin 9, which extends between the ends of the two legs of a U-shaped bracket 10 which is fixedly connected to the lower bar member 7. Also the wheel arms 6 are pivotally connected to the lower bar member 7 by means of pivot pins 11. The pivot pin 11 extends through the end of a leg of a substantially U-shaped bracket 12, which is connected to the lower bar member 7 in a similar manner as the U-shaped bracket 10. The upper bar member 8 is coupled to each wheel arm 6 by means of a respective coupling bar 13. Locking means (not shown) are provided for retaining the longitudinal bar 5 in the extended position thereof, as is shown in FIG. 1. As a result of the action of the coupling bars 13, the wheel arms 6 carrying the wheels 3 will be folded up jointly with the upper bar member 8, as a result of which a compact unit is obtained. At the free end of the upper bar member 8, a handle 4 is provided. The dimensioning and the relative positions of the various parts of the trolley 1 are such that if the lower end 14 of the lower bar member 7 and the two wheels 3 are supported on a flat surface, the trolley 1 will remain in balance and take up the position as shown in FIG. 1.

In comparison with trolleys according to the prior art, it is a striking and characteristic feature of the invention that the frame 2, or more specifically the longitudinal bar 5 thereof, is not provided with direct supporting elements for directly supporting a golf bag. What is shown in the figure, on the other hand, is the presence of a supporting element 15 extending perpendicularly to the lower bar member 7, to which it is fixedly connected. The supporting element 15 is provided with a U-shaped recess 16a, 16b on either side of the lower bar member 7. In addition to that, FIG. 1 shows a locking pin 17 suitable for being received in a locking hole 18, which is provided close to the upper end 19 of the lower bar member 7. The function of the supporting element 15 and of the locking pin 17 in combination with the locking hole 18 will be explained in more detail yet in the description of FIG. 2.

Figure 2:
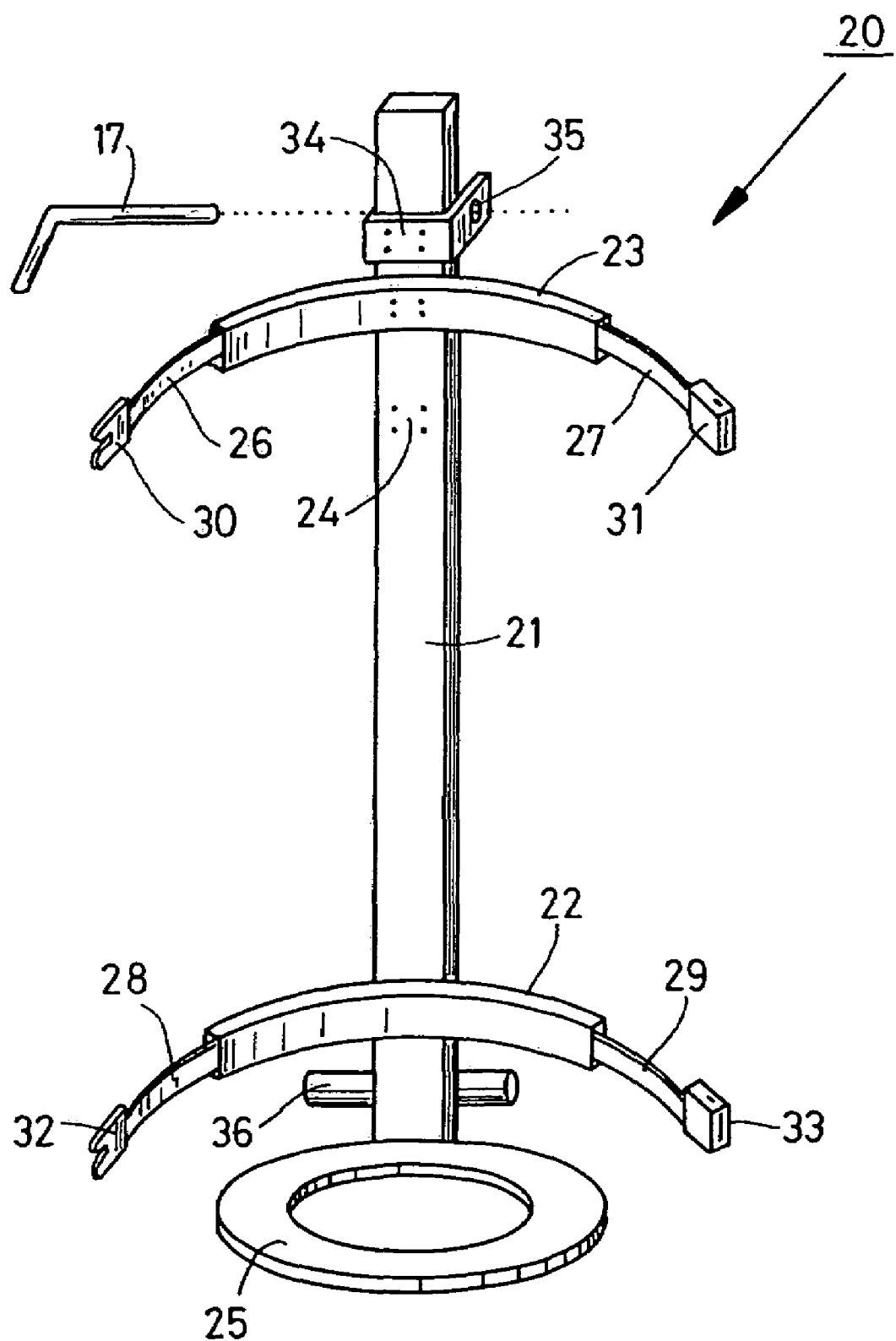
FIG. 2 shows the subframe of a device according to the invention.

FIG. 2 shows a subframe 20. The central part of a subframe 20 is formed by a subframe longitudinal bar 21, whose length corresponds more or less to that of a golf bag. C-shaped brackets 22, 23 are provided both near the upper side and near the lower side of the subframe longitudinal bar, which are connected to the subframe longitudinal bar 21 at their rear side, extending perpendicularly thereto. A pattern of holes 24 is formed in the subframe longitudinal bar 21 below the upper C-shaped bracket 23 in FIG. 2, as a result of which it is readily possible for a consumer to connect the upper C-shaped bracket 23 to the subframe longitudinal bar 21 at the location of the pattern of holes 24. Thus, the subframe 20 can be rendered suitable for use in combination with golf bags of various lengths. At the bottom side, a disc-shaped supporting platform 25 for supporting a golf bag is provided. The C-shaped brackets 22, 23 are each provided with two belt elements 26, 27 and 28, 29 at their ends. Snap connecting elements 30, 31 and 32, 33 capable of interlocking cooperation are provided on each of the free ends of the belt elements 26, 27, 28 and 29. In use, a golf bag (not shown) is placed on the disc-shaped supporting platform 25, after which the pairs of snap connecting elements 30, 31 and 32, 33 are interlocked, as a result of which the golf bag is surrounded by a C-shaped bracket in combination with the associated belt elements both at its upper side and at its bottom side. A U-shaped bracket 34 is rigidly connected to the subframe longitudinal bar 21 just above the C-shaped bracket 23. Holes 35 arranged in line with each other, only one of which is shown in FIG. 2, are formed in the rearwardly extending legs of the U-shaped bracket 34. On the rear side, a short, round bar 36 is fixedly connected to the rear side of the subframe longitudinal bar 21 between the lower C-shaped bracket 22 and the supporting platform 25. The bar 36 extends perpendicularly to the subframe longitudinal bar 21. The length of the bar 36 is identical to the length of the supporting element 15 in FIG. 1.

The subframe 20, including the golf bag, can easily be coupled to the trolley 1. In order to do so, the subframe 20, including the golf bag, is lifted and lowered again, as a result of which the bar 36 is placed into the U-shaped recesses 16a, 16b. Subsequently, the subframe 20 is tilted rearwards about the axis of the bar 36, as a result of which the subframe longitudinal bar 21 will be positioned parallel to the longitudinal bar 5. In that position, the legs of the U-shaped bracket 34 will extend on either side of the upper bar member 8, in such a manner that the holes 35 and the locking hole 18 will be in line, so that it is possible to pass the locking pin 17 through said holes. In this way, the subframe 20 is connected to the trolley 1 in a simple and reliable manner. It is completely irrelevant within the framework of the invention whether the connection between the subframe 20 and the trolley 1 takes place via the upper bar member 8 of via the lower bar member 7. What is important is the fact whether a manually detachable connection between the longitudinal bar 5 and the subframe 20 is provided, which is indeed the case. If the user wishes to detach the golf bag, it suffices for him or her to pull out of the locking pin 17, tilt the subframe 20 forwards and remove it from the U-shaped recesses 16a, 16b. The subframe 20 will remain connected to the golf bag, which will not be objectionable in practice. As an aside it is noted that in an alternative embodiment the bracket 34 may also be connected to the lower bar member 7 (at the same height), with the legs of the U-shaped bracket 34 being directed towards the subframe longitudinal bar 21 for laterally surrounding said bar.

Figure 3:
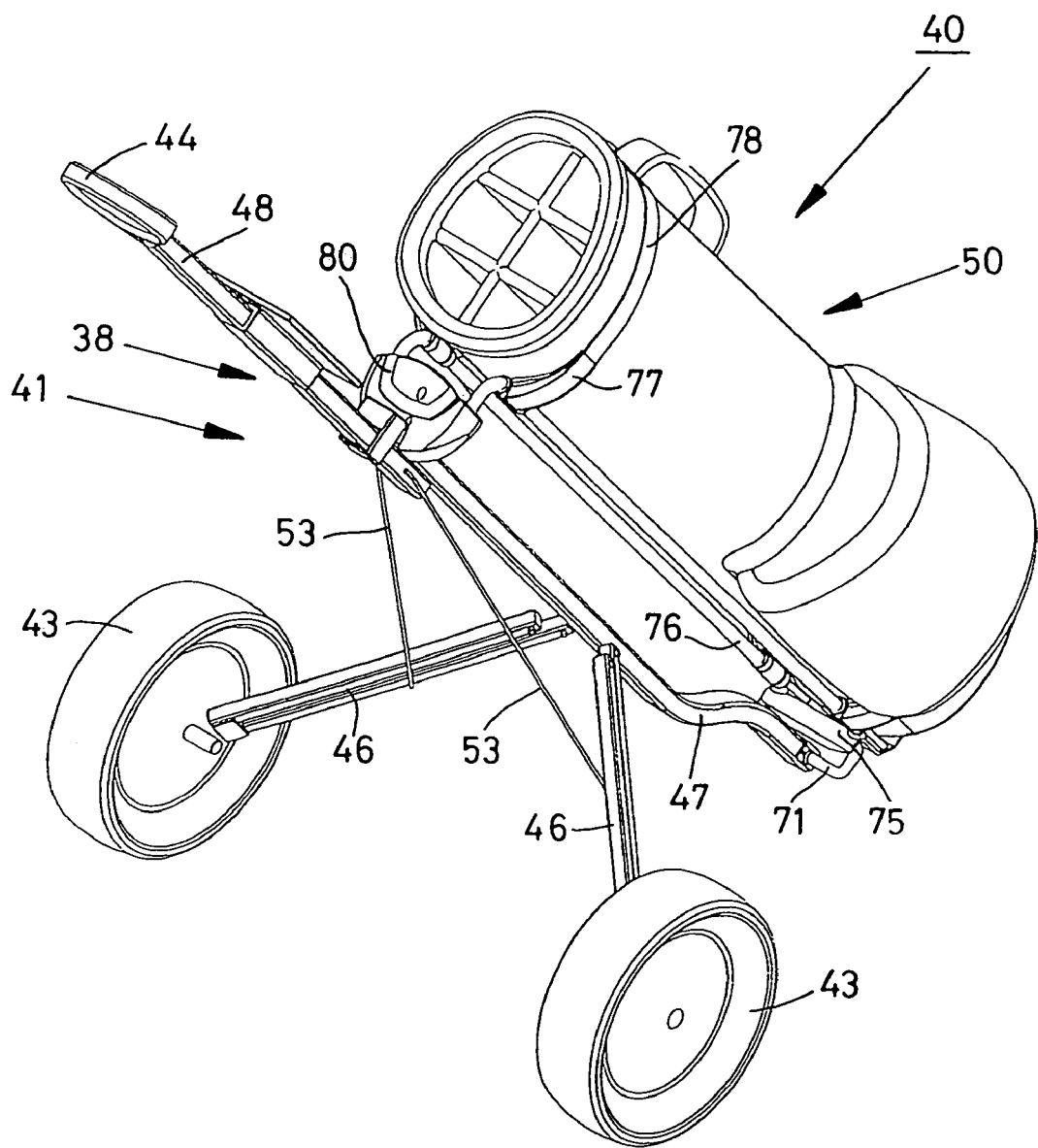
FIG. 3 shows a trolley with a golf bag according to a second embodiment of a device according to the invention.

FIG. 3 shows a trolley 40 including a golf bag 50. This embodiment, too, comprises a frame 41 fitted with wheels 43 and a handle 44. The frame 41 comprises a longitudinal bar 38 formed of two bar members 47, 48. Two foldable wheel arms 46 extend in V-shaped configuration between the wheels 43 and the lower bar member 47, which wheel arms are connected to the upper bar member 48 by means of connecting rods 53. A lower supporting bracket 71 is provided at the lower end of the lower bar member 47. The trolley 40 furthermore comprises a subframe 42 (also refer to FIG. 4), which is detachably connected to the frame 41 and to which the golf bag 50 is likewise detachably connected. The subframe 42 comprises a tubular construction 76 of inverted U-shape, whose upper end 72 is bent at right angles and which is provided with a supporting element 75 at the bottom side. The golf bag 50 is connected to the subframe 41 in the manner as described above by means of an upper fixing strap 78 and a lower fixing strap 79, whose snap connections are not shown in FIG. 2. The fixing straps 78, 79 are connected to the U-shaped tubular construction 76 by means of connecting pieces 77.

The connection between the frame 41 and the golf bag 50 via the subframe 42 of the trolley 40 is configured differently from that of the trolley 1 as shown in FIGS. 1 and 2. In order to connect the subframe 42 (and the golf bag 50 connected thereto) to the frame 41, the user hooks the supporting element 75 over the lower bracket, and the tilting movement causes the upper end 72 to mate with the locking assembly 80 that forms part of the frame 41. The locking co-operation thus obtained will be explained in more detail hereinafter. The locking assembly 80 provides an adequate locking engagement in this embodiment, which can be released in a simple manner.

Figure 4:
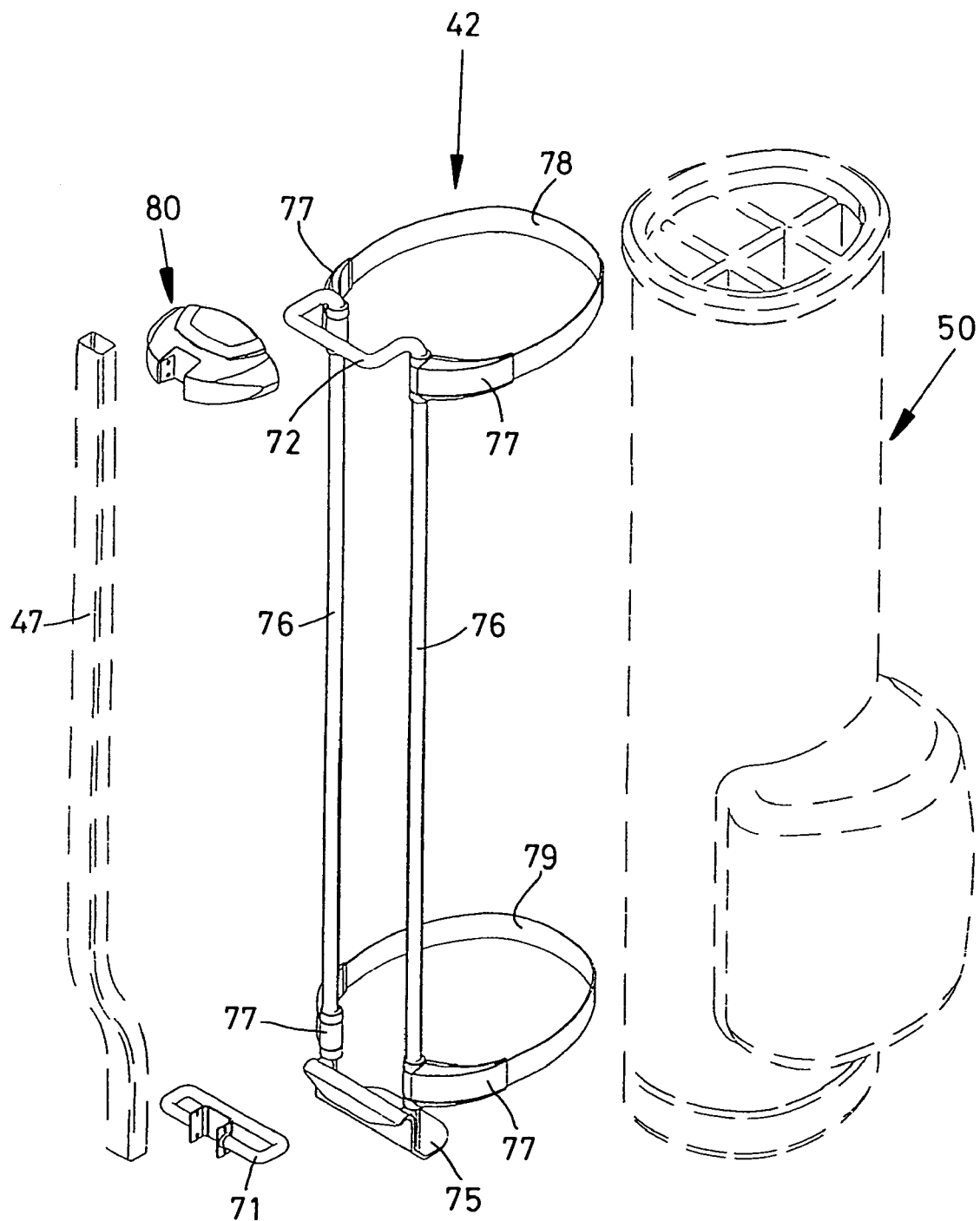

FIG. 4 is an exploded view of the connection between the frame 41, of which only the lower bar member 47 (illustrated in dotted lines) with the lower bracket 71 and the locking assembly 80 are shown in this figure, and the golf bag 50 via the subframe 42.

Figure 5:
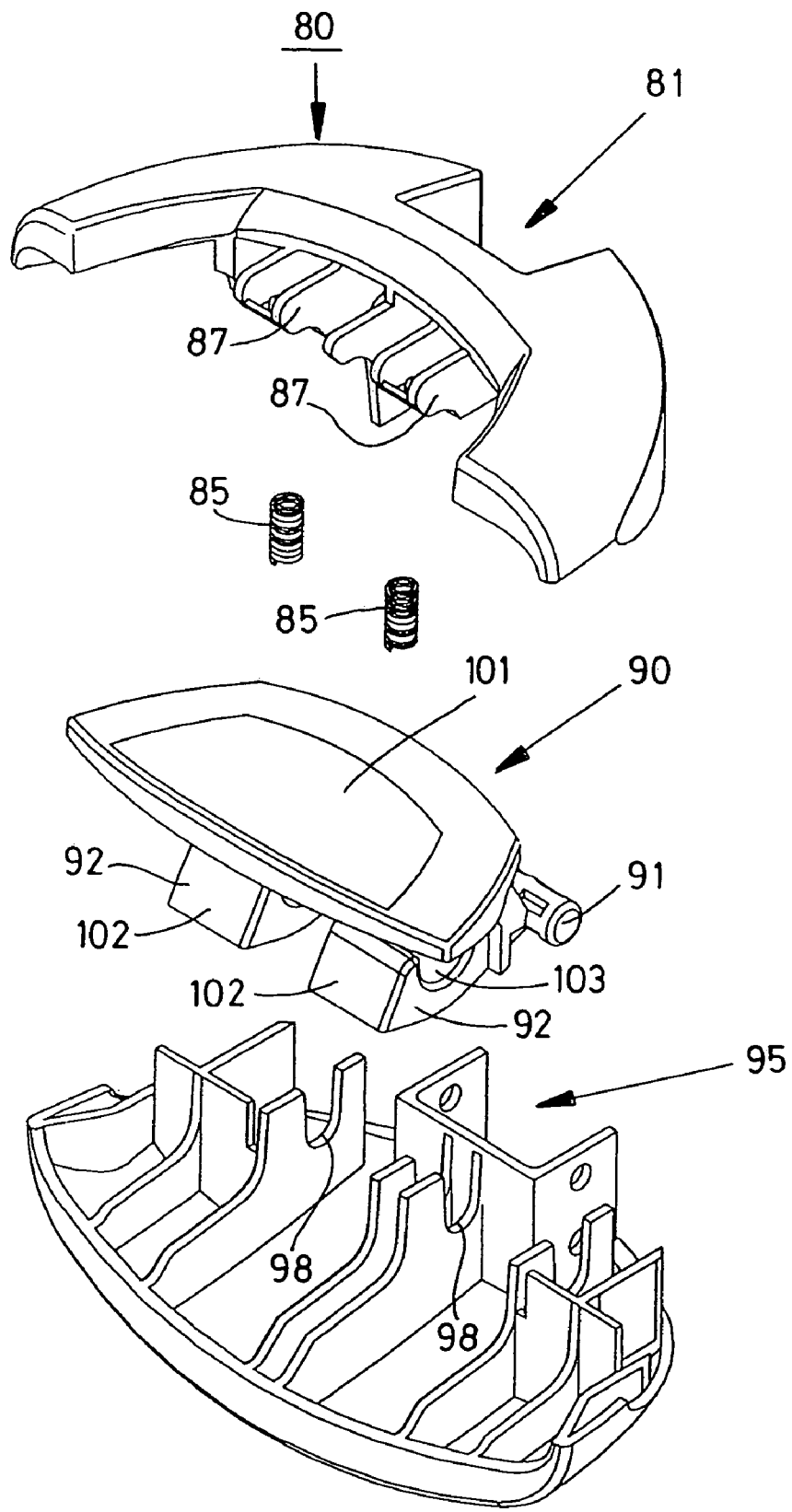
FIG. 5 is a perspective top plan view of a locking assembly of the trolley of FIG. 3.
Figure 6:
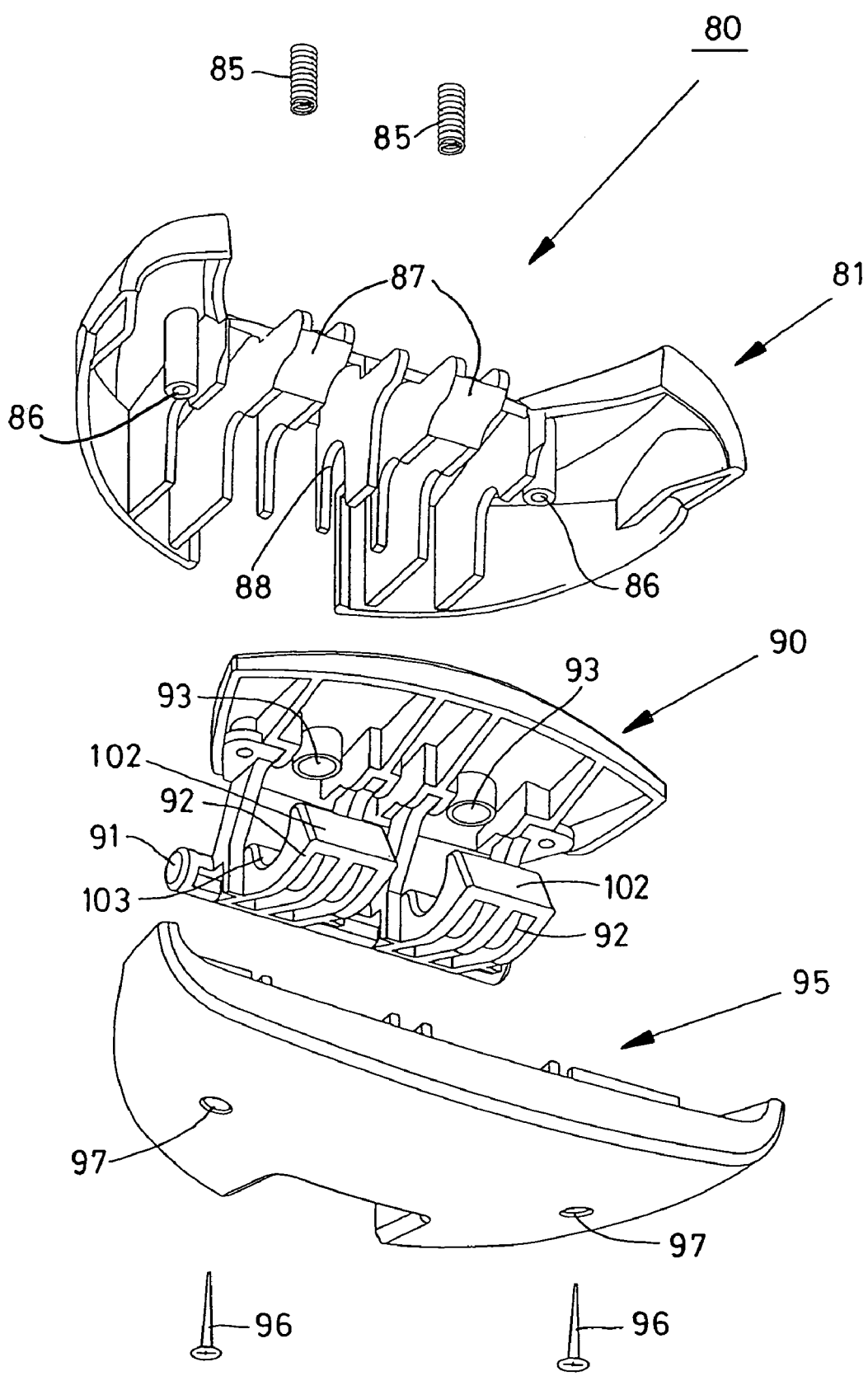
FIG. 6 is a perspective bottom plan view of the locking assembly.

FIGS. 5 and 6 are perspective views of the parts of the locking assembly 80. The locking assembly 80 is essentially built up of an upper locking element 81, compression springs 85, a connecting element 90 and a lower locking element 95. Recesses 98 are formed in the lower locking element 95, and a recess 88 is formed in the upper locking element 81 for receiving a pivot pin 91 of the connecting element 90. Screws 96 are provided for interconnecting the upper locking element 81 and the lower locking element 95, as a result of which the connecting element 90, or at least the pivot pin 91 thereof, is retained therebetween, which screws extend through bores 97 and which are in engagement with internal screw threads 86. Compression springs 85 are operative between the lower side of the control surface 101, which is to that end provided with sleeves 93 for receiving the upper sides of the springs 85, and the upper side of the lower locking element 95.

The connecting element 90 is provided with stop members 92, each having an inclined stop surface 102 directed towards the upper end 72, with a recessed engagement portion 103 for the upper end 72 being present behind each stop surface. When the upper end 72 strikes against the stop surfaces 102 upon tilting movement of the subframe 42 about the lower supporting bracket 71, the connecting element 90 pivots downwards against the action of the springs 85 until the upper end 72 falls within the engagement portion 103, whereupon the connecting element 90 pivots upwards again under the influence of the action of the springs 85. Thus a very reliable locking engagement between the subframe 42 (with the golf bag 50) and the framework 41 is effected. When the subframe 42 is to be disconnected from the frame 41, it suffices for a user to press the control surface 101 in downward direction so as to cause the connecting element 90 to pivot downwards, with the subframe 42 simultaneously tilting away from the frame 41 about the lower bracket.

In a variant of the trolley 40, a locking assembly such as the locking assembly 80 is mounted on the subframe 42, whilst an engagement portion comparable to the upper end 72 is fixedly connected to the longitudinal bar 38 for locking cooperation with the locking assembly.

Although the invention has been explained by means of an example relating to a golf trolley, it is noted that it is in principle possible to connect the subframe constructions to other devices as well, providing that means are present for realising a connection to the subframe constructions. Referring to FIGS. 1 and 2, a bar resembling the lower bar members 7 may be considered, which is likewise provided with a carrying element and a locking hole and which is mounted on the wall of a shed, being spaced therefrom by some distance. Alternatively, such a bar may be fixed to a golf cart or other vehicle. The subframe 20 is suitable for being connected to each of such bars.

Starting from an existing trolley system provided with various supporting elements, such as the trolley system disclosed in U.S. Pat. No. 5,451,072, it is possible to manufacture the trolley 1, for example, by removing said supporting elements and provide a supporting element 15 and a locking hole 18 instead. A trolley adapted in such a manner is in principle suitable for being used in combination with the subframe 20. The trolley 40 can be manufactured in a similar manner.

Furthermore it is possible to provide the subframe longitudinal bar 21 with two folding legs, similar to the wheel arms 6, but without wheels in this case, by means of which it is possible to position the frame 20 on a support surface in a stable manner, with the frame 20 resting on the lower side of the subframe longitudinal bar 21 and the lower sides of the folding legs. A comparable variant is also possible with the trolley 40, of course.

The invention claimed is:

1. A device for carrying a golf bag, comprising:
   a frame comprising a longitudinal bar;
   a subframe having a length corresponding substantially to that of a golf bag and further comprising at least one fixing strap connected to the subframe and adapted for releasably connecting a golf bag to the subframe;
   a supporting bracket attached to one of the longitudinal bar and the subframe;
   a supporting element connected to the other of the longitudinal bar and the subframe, the supporting element being adapted to releasably hook over the supporting bracket,
   an engagement portion connected to one of the longitudinal bar and the subframe;
   a locking assembly connected to the other of the longitudinal bar and the subframe, the locking assembly being adapted to receive and lock to the engagement portion;
   wherein the combination of the releasable connection of the supporting element to the supporting bracket and the releasable connection of the engagement portion to the locking assembly attaches and supports the subframe on the frame.

2. The device for carrying a golf bag according to claim 1, wherein the locking assembly is adapted to be released by a user pressing on a control surface of the locking assembly.

3. The device for carrying a golf bag according to claim 1, wherein the supporting element cannot be unhooked from the supporting bracket when the engagement portion is connected to the locking assembly.

4. The device for carrying a golf bag according to claim 1, wherein the supporting bracket and the supporting element are positioned adjacent lower ends of the longitudinal bar and the subframe, and the engagement portion and the locking assembly are spaced upwardly from the supporting bracket and the supporting element.

5. The device for carrying a golf bag according to claim 1, further comprising a handle attached to an upper end of the longitudinal bar.

6. The device for carrying a golf bag according to claim 1 wherein the subframe is provided with at least two folding legs.

7. The device for carrying a golf bag according to claim 1, wherein the longitudinal bar comprises a lower bar member joined to an upper bar member.

8. The device for carrying a golf bag according to claim 7, further comprising a handle attached to the upper bar member.

9. The device for carrying a golf bag according to claim 7, wherein the lower bar member is slidingly joined to an upper bar member.

10. The device for carrying a golf bag according to claim 7, further comprising:
two wheels; and
two foldable wheel arms extending in V-shaped configuration between the wheels and the lower bar member.

11. The device for carrying a golf bag according to claim 10, further comprising two connecting rods each joining one of the foldable wheel arms to the upper bar member.

12. A device for carrying a golf bag, comprising:
a frame comprising:
  a longitudinal bar comprising a lower bar member slidingly joined to an upper bar member;
  a handle attached to an upper end of the upper bar member;
  a lower supporting bracket attached adjacent a lower end of the lower bar member;
  two wheels;
  two foldable wheel arms extending in V-shaped configuration between the wheels and the lower bar member;
  two connecting rods each joining one of the foldable wheel arms to the upper bar member;
  a locking assembly attached to an upper end of the lower bar member, the locking assembly being adapted to be released by a user pressing on a control surface of the locking assembly;
a subframe comprising:
  an inverted U-shaped tubular construction having an upper end bent at right angles;
  a supporting element connected to a lower end of the U-shaped tubular construction;
  upper and lower fixing straps connected to the tubular construction and adapted for connecting a golf bag to the U-shaped tubular construction;
the supporting element being adapted to hook over the lower supporting bracket and the upper end of the tubular construction being adapted to mate with the locking assembly, the combination of the connection of the supporting element to the supporting bracket and the connection of the upper end of the tubular construction to the locking assembly supporting the frame,
whereby the subframe may be released from the frame by the user pressing on the control surface of the locking assembly to release the upper end of the tubular construction from the locking assembly and tilting the subframe about the lower supporting bracket and pulling the supporting element away from the lower supporting bracket.

* * * * *